June 10, 1930. S. CLEVELAND, JR 1,762,912
FIRE SHOVEL
Filed May 27, 1929
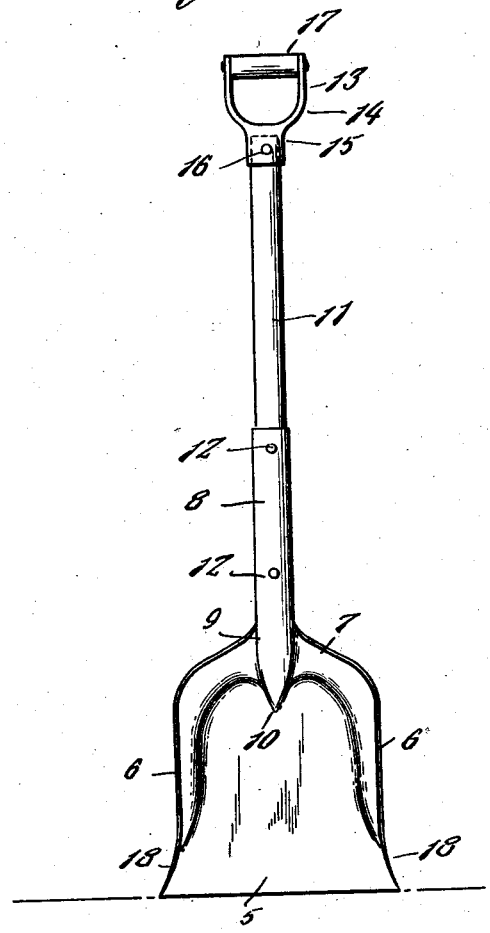
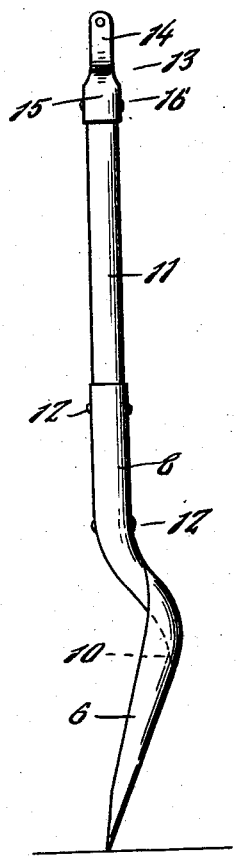
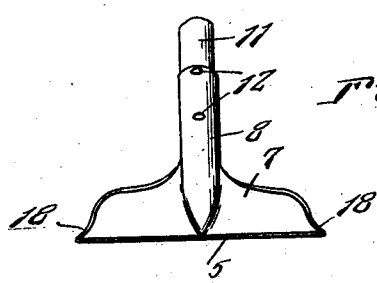
Inventor
Sim Cleveland, Jr.
By Clarence A. O'Brien
Attorney Patented June 10, 1930

1,762,912

UNITED STATES PATENT OFFICE

SIM CLEVELAND, JR., OF MACON, GEORGIA

FIRE SHOVEL

Application filed May 27, 1929. Serial No. 366,301.

This invention relates to improvements in shovels, and has as its primary object to provide a strong, durable shovel in the handling of coal for firing furnaces, and with this aim in view the invention consists in the provision of a shovel blade having a handle socket formed integrally therewith and of a suitable length to protect the handle and render the same fireproof.

Another very important object of this invention is to provide an improved shovel fully capable of giving long service, of such strength and size as to assure ease in the handling of coal, very simple in construction, can be manufactured and sold at a minimum cost, practicable, efficient and practicable in use.

Other objects and advantages of the invention will become apparent during a study of the following description taken in connection with the accompanying drawings, wherein:

Figure 1 is a face view of a shovel embodying the features of my invention.

Figure 2 is a side elevation thereof.

Figure 3 is a fragmentary detail perspective thereof.

With reference more in detail to the drawing, it will be seen that my improved shovel comprises a shovel blade and handle socket made from a single piece of sheet metal, and pressed to form a bottom 5, side walls 6, a rear wall 7 and an elongated tubular handle socket 8 merging at its lower end to the rear wall 7 as at 9 and merging therebeyond to terminate inwardly of the bottom 5 as at 10. An elongated stem 11 has one end fitted within the socket 8 for a suitable distance, so that, as will be noted the socket 8 extends upwardly of the stem 11 for a suitable distance, whereby to suitably protect the stem against the flame and heat of the furnace when the shovel is used for supplying coal to the furnace. The stem 11 is held firmly within the socket through the means of rivets 12 passing through the socket and stem 11 adjacent the upper and lower end portions of the socket respectively. A suitable handle 13 comprising the spaced forked legs 14 merge together at one end to terminate in a socket portion 15 through which the upper end of the stem 11 fits, and is held therein through the medium of a bolt or other suitable fastening means 16. The opposite ends of the forked legs 14—14 are secured together by means of a suitable handle grip 17.

It is to be noted that the side walls 6—6 of the shovel blade at their lower extremities merge into the blade and are curved outwardly in opposite directions as at 18, the shovel gradually decreasing in width from its forward end as it continues rearwardly toward the rear wall 7. The shovel being so formed it will be seen that the same permits of greater ease in the handling of the coal to the fire box, thus rendering the shovel especially adaptable for locomotive firemen, as well as for domestic use for coaling furnaces.

From the foregoing then it will be seen that I have provided a strong, durable and fire proof shovel, which may be of very light weight, permitting the use of a wooden handle stem, since it is apparent that the tubular handle portion of the shovel will securely protect the stem from the heat and flame of the fire box when the shovel is used for coaling purposes.

Even though I have herein shown and described certain detail structural elements of the invention, it is to be understood that the same is fully susceptible to changes comprehended by the spirit of the invention as herein described, and the scope of the appended claim.

Having thus described the invention, what I claim as new and desire to secure by Letters Patent is:—

A shovel blade formed from a single sheet of metal to provide a relatively flat bottom, a rear wall rising from said bottom, and spaced side walls merging at their rear ends into said rear wall, the bottom of said blade at the forward end thereof being of greater width than that portion of the bottom between the rearmost portions of said side walls, and said side walls from a point inwardly from the forward edge of the shovel slightly curving outwardly to conform with the width of the shovel at the forward edge portion of said shovel.

In testimony whereof I affix my signature.

SIM CLEVELAND, Jr.